United States Patent
Lagabrielle et al.

(10) Patent No.: US 6,731,114 B1
(45) Date of Patent: May 4, 2004

(54) APPARATUS WITH CAPACITIVE ELECTRODES FOR MEASURING SUBSURFACE ELECTRICAL CHARACTERISTICS IN THE SUBSOIL

(75) Inventors: Richard Lagabrielle, Nantes (FR); Virginie Leroux, Nantes (FR); Jean-Luc Sorin, Brains (FR)

(73) Assignee: Laboratoire Central des Ponts et Chaussees, Paris (FR)

( * ) Notice: Subject to any disclaimer, the term of this patent is extended or adjusted under 35 U.S.C. 154(b) by 0 days.

(21) Appl. No.: 09/762,136

(22) PCT Filed: Aug. 9, 1999

(86) PCT No.: PCT/FR99/01958
§ 371 (c)(1),
(2), (4) Date: Jan. 31, 2001

(87) PCT Pub. No.: WO00/08492
PCT Pub. Date: Feb. 17, 2000

(30) Foreign Application Priority Data

Aug. 7, 1998 (FR) .............................................. 98 10198

(51) Int. Cl.$^7$ ................................................ G01V 3/18
(52) U.S. Cl. ...................................... 324/372; 324/347
(58) Field of Search ................................ 324/366, 348, 324/370, 354, 355, 371, 372, 347, 352, 375, 360; 702/11, 6

(56) References Cited

U.S. PATENT DOCUMENTS

| | | | | |
|---|---|---|---|---|
| 2,165,213 A | * | 7/1939 | Blau et al. ................... | 324/355 |
| 3,497,958 A | * | 3/1970 | Gollwitzer ................... | 33/133 |
| 3,967,190 A | | 6/1976 | Zonge | |
| 3,973,181 A | | 8/1976 | Calvert | |
| 4,246,538 A | * | 1/1981 | Barker ........................ | 324/347 |
| 4,398,151 A | * | 8/1983 | Vinegar et al. ............. | 324/323 |
| 5,387,869 A | | 2/1995 | Enomoto | |
| 5,587,659 A | * | 12/1996 | Sorensen ..................... | 324/357 |
| 6,166,540 A | * | 12/2000 | Wollin ........................ | 324/300 |

FOREIGN PATENT DOCUMENTS

WO 92/13286 6/1992

OTHER PUBLICATIONS

Peden, I.R., et al. "An Experiment for Determining the VLF Permittivity of Deep Antarctic Ice", IEEE Transactions on Geoscience Electronics, vol. GE–9, pp. 224–233, (Oct. 1971), XP–002100759.

* cited by examiner

*Primary Examiner*—John Barlow
*Assistant Examiner*—Toan M. Le
(74) *Attorney, Agent, or Firm*—Nath & Associates PLLC; Marvin C. Berkowitz

(57) ABSTRACT

The invention relates to apparatus with capacitive electrodes for electrical prospecting in a borehole, the apparatus comprising at least two injection electrodes (16, 18), at least two measurement electrodes (28, 34), and a current generator (22) for applying an electrical current between the two injection electrodes. The current generator (22) delivers alternating current at a frequency of 5 kHz to 100 kHz and at a voltage of less than 1000 volts. At least one of the measurement or injection electrodes (16, 28) is placed in a borehole (12, 14) and presents an outer surface that is cylindrical and electrically conductive. The apparatus further comprises means (24) for measuring the current flowing through said injection electrodes, means (36, 36b) for measuring the potential difference between the measurement electrodes, and means for processing the measured current and potential difference to deduce therefrom the characteristics of the subsoil in which the borehole is situated.

17 Claims, 3 Drawing Sheets

Figure 1:
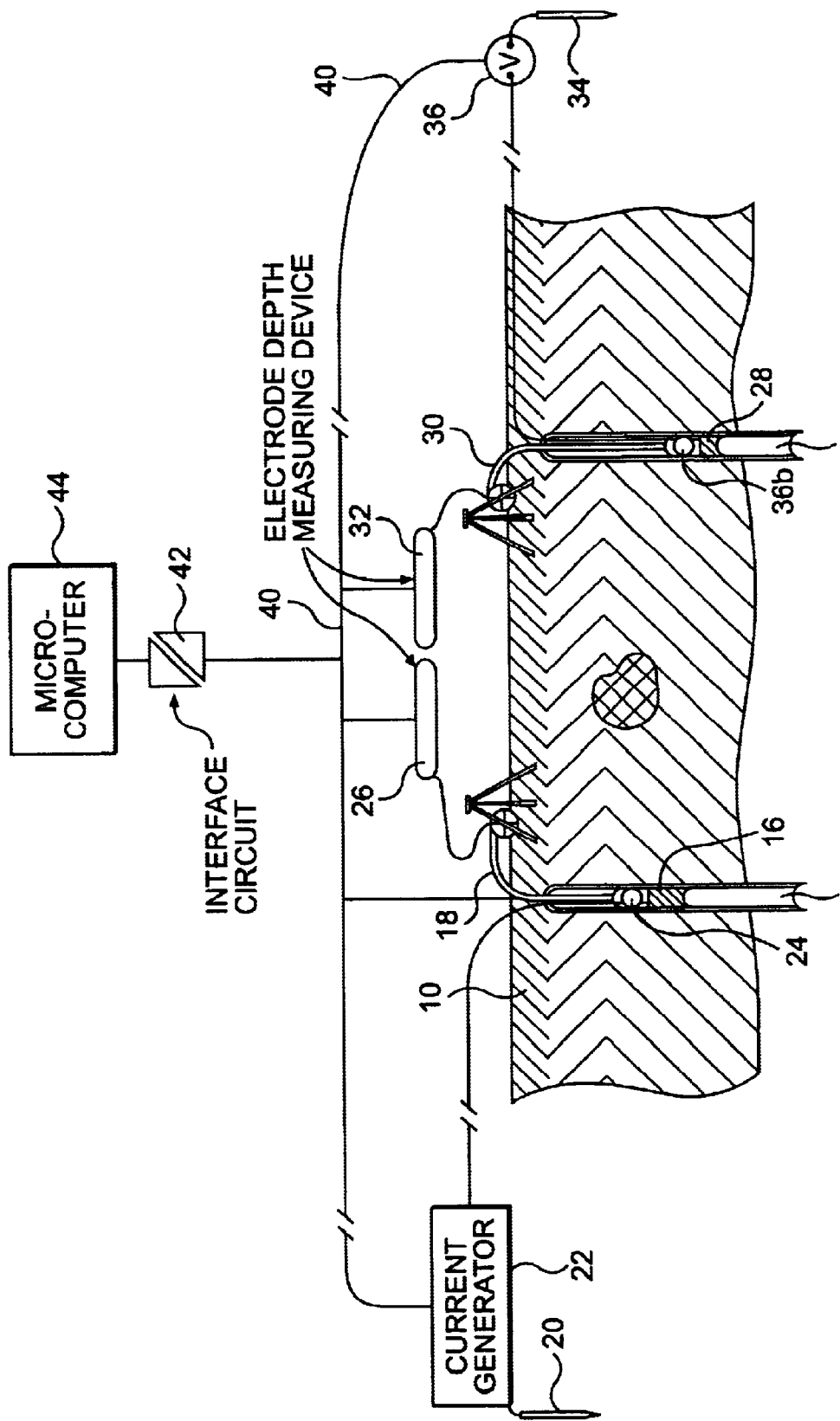

APPARATUS WITH CAPACITIVE ELECTRODES FOR MEASURING SUBSURFACE ELECTRICAL CHARACTERISTICS IN THE SUBSOIL

The present invention relates to apparatus having capacitive electrodes for measuring electrical characteristics in the subsoil.

DC electrical prospecting techniques have long shown their effectiveness in prospecting and surveying the subsoil. Those methods have been developed continuously for surveying from the surface of the ground. When implemented in boreholes, those techniques have become known as electrical logging, electrical tomography, electrical cylinder, . . . Whatever the particular technique that is in use, it is always based on using at least four electrodes: two "current injection" electrodes for injecting a current I into the ground, and two other electrodes (referred to as "measurement" or "potential" electrodes) between which the resulting potential difference is measured. It is the shape of the two-port network constituted by those four electrodes at their positions on the surface of the ground and/or in one or more boreholes that determine the particular name given to the technique.

In those electrical measurement techniques, it is desired to survey the subsoil over a thickness of several tens of meters at most; for that purpose, boreholes are drilled. The terrain is often heterogeneous, weathered, and the boreholes need to be cased. In addition, they are often above the level of the water table, at least in part, in which case they do not contain water. Furthermore, they do not always have a fluid that conducts electricity.

In other words, in such situations, it is not possible by conductive coupling to establish electrical circuit continuity between the various electrodes in use and the subsoil in which measurements are to be performed.

An object of the present invention is to provide apparatus for measuring the electrical characteristics of the subsoil from a borehole, which apparatus can be used in particular when no means are available for providing electrical continuity by conduction between the electrode(s) placed in the borehole(s) and the subsoil which is to be measured.

To achieve this object, the invention provides apparatus with capacitive electrodes for electrical prospection in a borehole, the apparatus comprising at least two injection electrodes and a current generator for injecting current into the ground via them, and also two measurement electrodes and means for measuring the potential difference between them, the apparatus being characterized in that:

said current generator delivers alternating current at a frequency preferably lying in the range 5 kHz to 100 kHz and at a voltage of less than 1000 volts;

at least one of the four electrodes is designed to be placed in a borehole and has an outer surface that is substantially cylindrical and electrically conductive;

and in that it further comprises:

means for measuring the current flowing through said injection electrodes;

means for measuring the potential difference between said measurement electrodes; and means for processing said current measurement and said potential difference measurement to deduce therefrom the characteristics of the subsoil in which the borehole is situated.

It will be understood that by means of the dispositions of the invention, resistive coupling is indeed established between the electrode(s) disposed in the borehole(s) and the subsoil in which measurement is to be performed, even though no means enable conduction to be provided by electrical continuity between the electrodes and the subsoil.

This coupling is of sufficiently good quality to enable the measurements taken to be usable for surveying the electrical characteristics of the subsoil that is to be prospected.

In a preferred embodiment, at least one of said injection electrodes is for placing in the borehole. It is then substantially cylindrical and has an electrically conductive outer surface.

In another preferred embodiment, the device for measuring the injected current and the injection electrode are mounted on a common component for placing in the borehole in the desired position(s), depending on the measurements that are to be performed.

It will be understood that by means of this disposition, the injected current can be measured with great accuracy, thereby facilitating interpretation of the results.

According to another preferred characteristic, at least one of said measurement electrodes is for placing in a borehole. It is then substantially cylindrical and has an electrically conductive outer surface, and it is secured to a portion of the device for measuring voltage.

This disposition makes it possible to improve the accuracy with which the potential difference between the measurement electrodes is measured.

Figure 8:
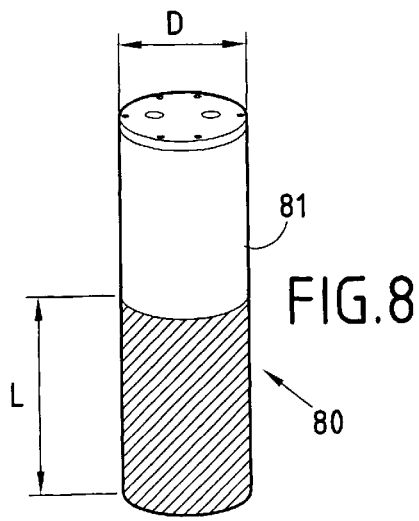
Figure 9:
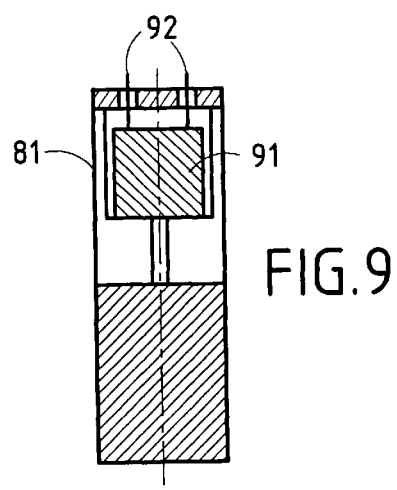

Other characteristics and advantages of the invention will appear more clearly on reading the following description of various preferred embodiments of the invention given as non-limiting examples. The description refers to the accompanying figures, in which:

FIG. 1 is a simplified view of a first embodiment of the apparatus for performing measurements by capacitive coupling;

FIGS. 2, 3, 4, 5, 6, and 7 are simplified diagrams showing other possible configurations for the injection and potential electrodes;

FIG. 8 is a perspective view of a preferred embodiment of an electrode for placing in a borehole; and FIG. 9 is a vertical section view of the FIG. 8 electrode.

With reference initially to FIG. 1, a first embodiment of the measurement apparatus as a whole is described in which a measurement electrode and an injection electrode are placed in two boreholes.

A first embodiment of the measurement apparatus of the invention is described as a whole with reference to FIG. 1.

The figure shows the surface 10 of ground in which two boreholes 12 and 14 have been drilled in a zone whose electrical characteristics are to be determined. The installation comprises firstly an injection electrode 16 placed in the first borehole 12 and suspended from a cable 18. The second injection electrode is constituted by a metal spike 20 forced into the ground and whose distance from the borehole 12 can be considered as being infinite in the electrical sense of the term. The injection electrodes 16 and 20 are connected to an alternating current generator 22. The injection electrode 16 placed in the borehole 12 is associated with a current measuring device 24. The support cable 18 also preferably includes electrical conductors firstly for connecting the electrode to the generator 22 and secondly for connecting the current measuring device to the system for controlling the installation as a whole. In addition, a device 26 enables the position of the electrode 16 in the borehole 12 to be determined.

A first measurement electrode 28 is placed in the borehole 14 and is likewise suspended from the end of a cable 30 associated with means 32 for measuring the position of the electrode 28 in the borehole 14. A second measurement electrode 34 is constituted by a metal spike engaged in the ground at a distance which can be considered as being infinite from the electrical point of view.

A voltmeter or analogous device 36 serves to measure the electrical potential difference between the measurement electrodes 28 and 34. It can include a portion 36b carried with the electrode 28 in the borehole 14.

A communications bus 40 serves to connect the current generator 22, the devices 26 and 32 for measuring electrode depth, and the voltmeter 36 to an interface circuit 42. The interface circuit 42 thus enables each of the above-mentioned portions to be connected to a central installation for managing the apparatus as a whole and which can advantageously be constituted by a microcomputer 44.

As already mentioned, in the invention, it is possible for the boreholes 12 and 14 to be cased, e.g. with a non-conductive material such as a plastics material, or indeed it is possible that the boreholes 12 and 14 are not filled with any electrically-conductive fluid.

As already mentioned above, in the invention, coupling between the electrodes 16, 20, 28, 34 and the ground in which measurements are to be performed is of the capacitive type, at least so far as the electrodes 16 and 28 are concerned. To be able to perform measurements under good conditions, the controllable-frequency current generator is associated with an amplifier that enables its output voltage to be adapted.

As explained in greater detail below, the electrodes 16 and 28 placed in the boreholes 12 and 14 are substantially cylindrical in shape and have outer surfaces constituted by a material that conducts electricity. They are given dimensions that are suitable for providing good capacitive coupling between the electrodes and the subsoil.

By measuring firstly the electrical potential difference V between the electrodes 28 and 34, and secondly the current I that is actually injected by the electrodes 16 and 20, it is possible to deduce a transfer impedance measurement Z=V/I which depends on the electrical properties of the subsoil and on the geometrical disposition of the electrodes. This processing can be performed by the central unit 44.

With reference now to FIGS. 8 and 9, there follows a description of a preferred embodiment of the capacitive electrodes of the invention. These electrodes for insertion in the boreholes are substantially in the form of a cylinder 80 of length L and of diameter D. They are covered in a conductive material which is therefore likewise substantially cylindrical in shape. They are surmounted by respective compartments 81 containing respective measuring instruments 91 that are electrically connected to the outer conductive surface of the respective electrodes. The measuring instrument 91 is an ammeter when the cylinder 80 constitutes an injection electrode, and a voltmeter when the cylinder constitutes a measurement electrode. Naturally, each measuring instrument 91 is connected to terminals 92 in turn connected to external conductors enabling the measurements performed by the instrument 91 to be conveyed to the bus 40 and thus to the processor 44.

The diameter D of the electrodes matches the diameter of the borehole and the length L thereof is adapted accordingly so that their engagement impedance enables the desired amount of current to be injected. The length L of the current electrodes or of the potential electrodes can be as much as 1 meter or even longer, and their diameter lies in the range a few centimeters to about 15 centimeters. Naturally, the diameter must be less than the diameter of the borehole but not much less so as to ensure that the capacitive coupling is of good quality.

In a preferred implementation, the potential difference between the two potential electrodes is measured by a device that is in two portions: firstly a very high impedance input head disposed close to the capacitive electrode in the borehole, and secondly a voltmeter enabling measurement to be performed relative to a reference which is the potential of the other electrode that is far away, and that also serves to compensate for capacitive losses along the measuring cables.

In a situation where the two potential electrodes are close together, the device for measuring the potential difference between the two measurement electrodes as described above could be brought together so as to constitute a single device.

The frequency of the current is preferably 1 kHz to several tens of kHz, and the voltage delivered can be several hundreds of volts.

This apparatus having capacitive electrodes in boreholes can be used in a wide variety of configurations. Naturally, in all cases, the borehole electrodes can be movable.

FIGS. 2 to 7 show various possible configurations for the measurement electrodes and the injection electrodes.

Figure 2:
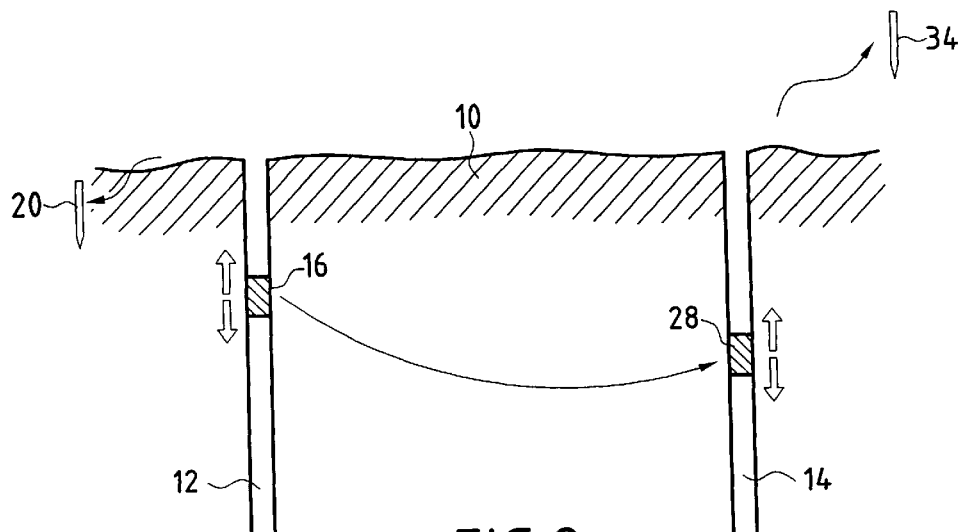

FIG. 2 corresponds to FIG. 1 and shows that the injection electrode 16 and the measurement electrode 28 can be moved in the boreholes 12 and 14 so as to perform different measurements. There is a pole-to-pole configuration between the boreholes.

Figure 3:
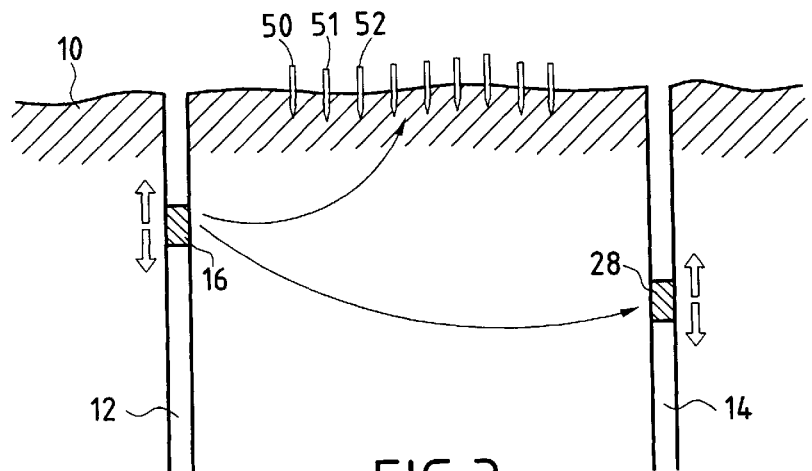

In FIG. 3, measurements can be performed between the injection electrode 16 and the measurement electrode 28 which are disposed in the boreholes, or between the injection electrode 16 and the measurement electrodes constituted by metal spikes 50, 51, 52, etc.

Figure 4:
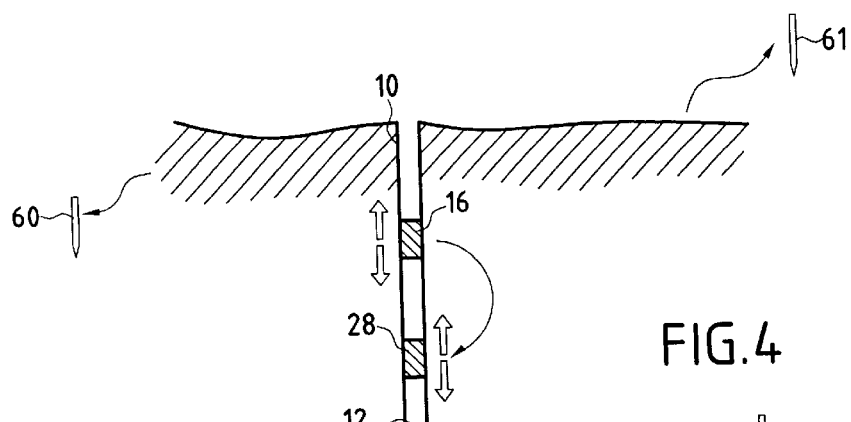

In FIG. 4, an injection electrode 16 and a measurement electrode 28 are both placed in the same borehole 12. The other electrodes are constituted by spikes 60 and 61. This configuration corresponds to a pole-to-pole measurement performed in a borehole (or to pole-to-pole logging if the spacing between the two electrodes is fixed).

Figure 5:
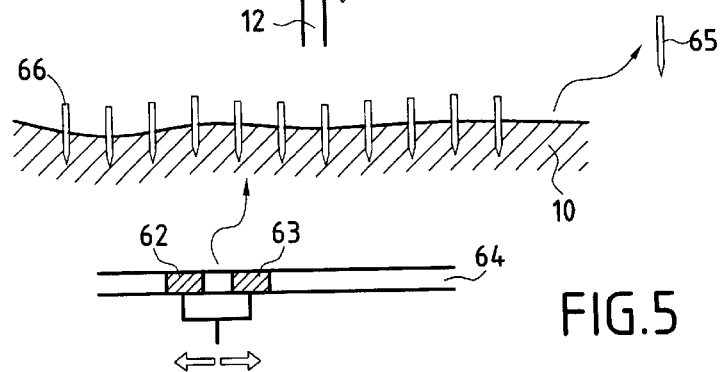

In FIG. 5, the two injection electrodes 62 and 63 can be moved separately or together in a borehole 64, e.g. a horizontal borehole. The measurement electrodes are constituted firstly by a conductive spike 65 that is infinitely far away and secondly by a series of metal spikes 66 driven into the ground. Potential difference is measured at one of the spikes 66. For each position of the injection electrodes, as many measurements are obtained as there are spikes 66.

Figure 6:
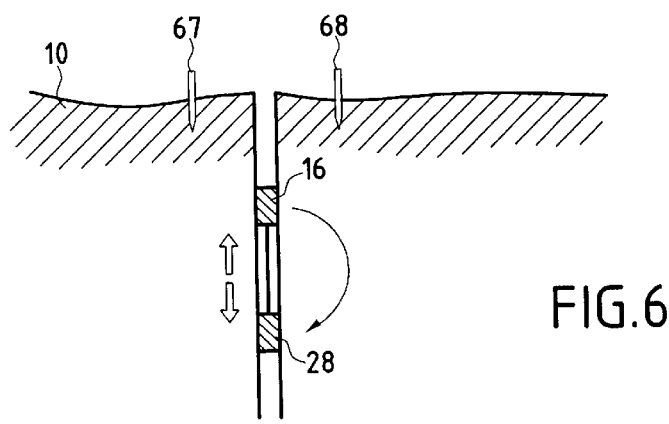

In FIG. 6, an injection electrode 16 is lowered down the borehole together with a measurement electrode 28. Current is injected by means of the electrode 16 and a spike 67 driven into the ground at a distance from the borehole that is not infinite in the electrical meaning of the term. The potential difference is measured between the electrode 28 and a spike 68 driven into the surface of the ground at a distance from the borehole that is not infinite in the electrical meaning of the term.

Figure 7:
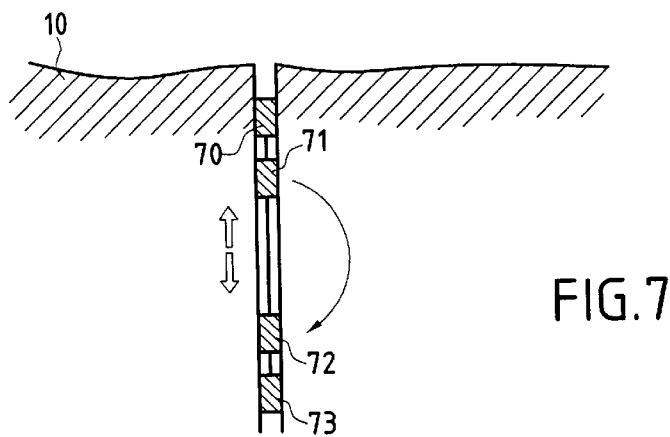

In FIG. 7, the four electrodes 70, 71, 72, and 73 are all placed in the borehole. Current is injected via the electrodes 70 and 71. The potential difference is measured between the electrodes 72 and 73. By way of example, the measurements can then be of the dipole-to-dipole type in the borehole or they can be implemented using other two-port network configurations with multiple electrode spacings. If the spacing between the electrodes is fixed, it is possible to perform electrical logging. It is also possible to have only one measurement electrode in the borehole, with the injection electrodes and the other measurement electrode(s) being placed on the surface.

The instrumented portions of the borehole electrodes are preferably detachable thus enabling them to be fitted to electrodes of a variety of shapes and sizes which are selected depending on the boreholes in which they are to be used.

What is claimed is:

1. Apparatus with capacitive electrodes for electrical prospecting in a borehole, comprising
    at least two injection electrodes;
    at least two measurement electrodes, distinct from said at least two injection electrodes;
    a current generator for applying an electrical current between two of said injection electrodes, said current generator delivering alternating current at a frequency lying in the range 5 kHz to 100 kHz and at a voltage of less than 1000 volts;
    at least one support cable provided with electrical conductors, at least one of the measurement or injection electrodes being suspended from said cable and placed in said borehole, said suspended electrode having an outer surface that is substantially cylindrical and electrically conductive and having a sufficient length and a diameter matching that of said borehole and capacitively coupled with ground surrounding said borehole;
    means for displacing said suspended electrode in the borehole by means of the cable;
    means for measuring a position of said suspended electrode in said borehole;
    means for measuring current flowing through said at least two injection electrodes;
    means for measuring a potential difference between the at least two measurement electrodes; and
    means for processing said current measurement and said potential difference measurement to deduce therefrom characteristics of subsoil in which the borehole is situated, for said measurement position.

2. Apparatus according to claim 1, wherein said substantially cylindrical electrode is an injection electrode, said injection electrode and a current measuring device being mounted on a common component for placement in the borehole.

3. Apparatus according to claim 1, wherein said substantially cylindrical electrode is a measurement electrode, said measurement electrode being mounted on a same component as a portion of the potential difference measuring means, said component being for placement in the borehole.

4. Apparatus according to claim 3, wherein the potential difference measuring means further comprises a second portion enabling the potentials of two measurement electrodes to be compared and enabling losses in the cable interconnecting them to be compensated, together with means for processing the measured voltages.

5. Apparatus according to claim 3, wherein a second measurement electrode is for placement in the borehole, wherein said second measurement electrode is cylindrical and presents an electrically conductive outer surface, and wherein said second measurement electrode and a second voltage measuring device are mounted on a common component for placement in the borehole.

6. Apparatus according to claim 1, comprising a second injection electrode for placement in the borehole, wherein said second injection electrode is substantially cylindrical and presents an electrically conductive outer surface, with at least an "amplifier" portion of the current generator being mounted on a same component as the second injection electrode which component is for placement in the borehole.

7. Apparatus according to claim 1, wherein at least one of said at least two injection electrodes and at least two measuring electrodes is movable in the borehole, and wherein said apparatus further comprises means for measuring the position of each electrode that is movable in the borehole.

8. Apparatus according to claim 1, in which instrumented portions of a suspended borehole injection electrode comprising part of the current generator can be detached therefrom and fitted to others of said at least two injection electrodes of a variety of sizes and shapes selected as a function of boreholes in which they are to be implemented.

9. Apparatus according to claim 1, in which instrumented portions of a suspended borehole measurement electrode comprising part of the potential difference measuring means can be detached therefrom and fitted to others of said at least two measurement electrodes of a variety of sizes and shapes selected as a function of boreholes in which they are to be implemented.

10. Apparatus with capacitive electrodes for electrical prospecting in a borehole, comprising
    at least two injection electrodes;
    at least two measurement electrodes, distinct from said at least two injection electrodes;
    a current generator for applying an electrical current between two of said injection electrodes, said current generator delivering alternating current at a frequency lying in the range 5 kHz to 100 kHz and at a voltage of less than 1000 volts;
    at least one support cable provided with electrical conductors, at least one of the measurement or injection electrodes being suspended from said cable and placed in said borehole, said suspended electrode having an outer surface that is substantially cylindrical and electrically conductive and having a sufficient length and a diameter matching that of said borehole and capacitively coupled with ground surrounding said borehole;
    means for displacing said suspended electrode in the borehole by means of the cable;
    means for measuring a position of said suspended electrode in said borehole;
    means for measuring current flowing through said at least two injection electrodes;
    means for measuring a potential difference between the at least two measurement electrodes; and
    means for processing said current measurement and said potential difference measurement to deduce therefrom characteristics of subsoil in which the borehole is situated, for said measurement position,
    wherein said substantially cylindrical electrode is an injection electrode, and said injection electrode and a current measuring device are mounted on a common component for placement in the borehole.

11. Apparatus according to claim 10, comprising a second injection electrode for placement in the borehole, wherein said second injection electrode is substantially cylindrical and presents an electrically conductive outer surface, with at least an "amplifier" portion of the current generator being mounted on a same component as the second injection electrode which component is for placement in the borehole.

12. Apparatus according to claim 10, wherein at least one of said at least two injection electrodes and at least two measuring electrodes is movable in the borehole, and wherein said apparatus further comprises means for measuring the position of each electrode that is movable in the borehole.

13. Apparatus according to claim 10, in which instrumented portions of a suspended borehole injection electrode comprising part of the current generator can be detached therefrom and fitted to others of said at least two injection electrodes of a variety of sizes and shapes selected as a function of boreholes in which they are to be implemented.

14. Apparatus according to claim 10, in which instrumented portions of a suspended borehole measurement electrode comprising part of the potential difference measuring means can be detached therefrom and fitted to others of said at least two measurement electrodes of a variety of sizes and shapes selected as a function of boreholes in which they are to be implemented.

15. Apparatus with capacitive electrodes for electrical prospecting in a borehole, comprising at least two injection electrodes;

at least two measurement electrodes, distinct from said at least two injection electrodes;

a current generator for applying an electrical current between two of said injection electrodes, said current generator delivering alternating current at a frequency lying in the range 5 kHz to 100 kHz and at a voltage of less than 1000 volts;

at least one support cable provided with electrical conductors, at least one of the measurement or injection electrodes being suspended from said cable and placed in said borehole, said suspended electrode having an outer surface that is substantially cylindrical and electrically conductive and having a sufficient length and a diameter matching that of said borehole and capacitively coupled with ground surrounding said borehole;

means for displacing said suspended electrode in the borehole by means of the cable;

means for measuring a position of said suspended electrode in said borehole;

means for measuring current flowing through said at least two injection electrodes;

means for measuring a potential difference between the at least two measurement electrodes; and means for processing said current measurement and said potential difference measurement to deduce therefrom characteristics of subsoil in which the borehole is situated, for said measurement position, wherein said substantially cylindrical electrode is a measurement electrode, said measurement electrode being mounted on a same component as a portion of the potential difference measuring means, said component being for placement in the borehole.

16. Apparatus according to claim 15, wherein the potential difference measuring means further comprises a second portion enabling the potentials of two measurement electrodes to be compared and enabling losses in the cable interconnecting them to be compensated, together with means for processing the measured voltages.

17. Apparatus according to claim 15, wherein a second measurement electrode is for placement in the borehole, wherein said second measurement electrode is cylindrical and presents an electrically conductive outer surface, and wherein said second measurement electrode and a second voltage measuring device are mounted on a common component for placement in the borehole.

* * * * *